United States Patent
Holzmann et al.

[11] Patent Number: 5,812,145
[45] Date of Patent: Sep. 22, 1998

[54] MESSAGE SEQUENCE CHART ANALYZER

[75] Inventors: Gerard Johan Holzmann, Murray Hill; Doron A. Peled, New Providence, both of N.J.

[73] Assignee: Lucent Technologies Inc., Murray Hill, N.J.

[21] Appl. No.: 559,325

[22] Filed: Nov. 16, 1995

[51] Int. Cl.[6] ................................................. G06T 11/00
[52] U.S. Cl. ........................................................... 345/440
[58] Field of Search ................................. 395/140, 326, 395/329, 333, 334, 335, 339; 345/440

[56] References Cited

U.S. PATENT DOCUMENTS 5,450,569  9/1995  Schallier ............................ 395/500 X

OTHER PUBLICATIONS

"Using Formalized Temporal Message–flow Diagrams", W. Citrin, A. Cockburn, J. Von Kanel, and R. Hauser, *Software–Practice and Experience*, vol. 25(12), Dec. 1995, pp. 1367–1401.

"An Algebraic Semantics of Basic Message Sequence Charts", S. Mauw and M. A. Reniers, *The Computer Journal*, vol. 37, No. 4, 1994, pp. 1–9.

*Primary Examiner*—Almis R. Jankus
*Attorney, Agent, or Firm*—Donald P. Dinella; Gordon E. Nelson

[57] ABSTRACT

Apparatus and methods for editing message sequence charts and determining whether a message sequence chart is consistent with a semantic of the system which the message sequence chart represents. As an editor, the apparatus maintains an internal representation of the message sequence chart as a set of processes and events, displays an image of the message sequence chart, and modifies the internal representation in response to modifications of the image by the user. The internal representation can be used to produce further representations of the message sequence chart. One of the representations is an event list which lists send events and receive events in the message sequence chart in a visual order. The event list is used together with a semantic provided by the user of the apparatus to determine whether there is an inconsistency between the message sequence chart and the semantic.

12 Claims, 6 Drawing Sheets

| | A | B | C | D | E |
|---|---|---|---|---|---|
| SINGLE FIFO | $r \ll s$ | $s \sqsubset r$ | $s_1 \ll s_2$ | $r_1 \sqsubset r_2$ | $r_1 \ll r_2$ |
| FIFO/SOURCE | $r \ll s$ | $s \sqsubset r$ | $s_1 \ll s_2$ | none | $r_1 \ll r_2$ |
| NON-FIFO | $r \ll s$ | $s \sqsubset r$ | $s_1 \ll s_2$ | $r_1 \sqsubset r_2$ | $r_1 \sqsubset r_2$ |
| NON-FIFO/SOURCE | $r \ll s$ | $s \sqsubset r$ | $s_1 \ll s_2$ | none | $r_1 \sqsubset r_2$ |

MESSAGE SEQUENCE CHART ANALYZER

BACKGROUND OF THE INVENTION

1. Field of the Invention

The invention relates generally to the design of systems with concurrently-operating components and more specifically to the use of visual formalisms in designing such systems.

2. Description of the Prior Art

Figure 1:
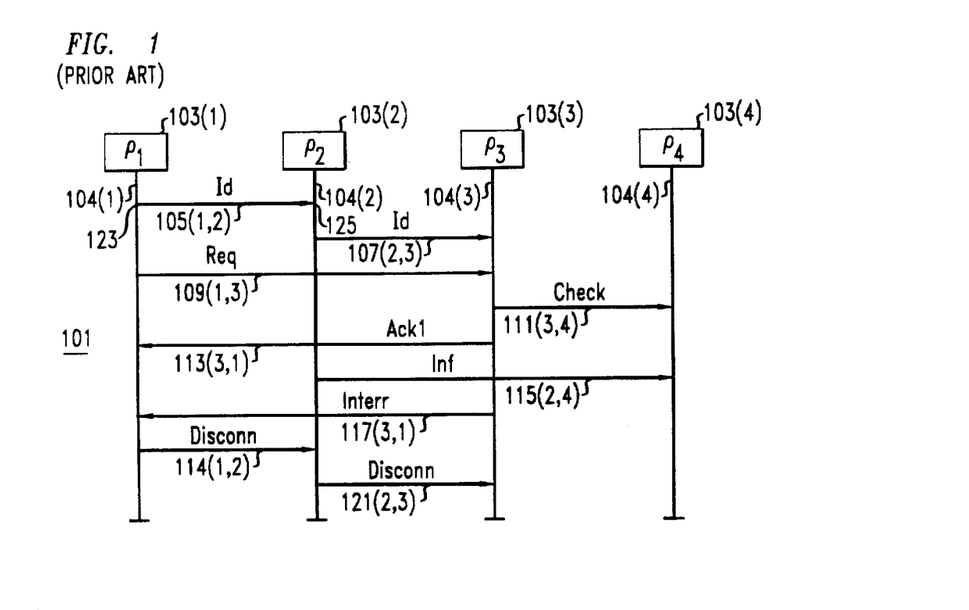
FIG. 1 is a simple MSC.

Message sequence charts (MSCs)—also known as time sequence diagrams, message flow diagrams, or object interaction diagrams—are a popular visual formalism for documenting design requirements for concurrent systems. FIG. 1 shows a typical message sequence chart 101 for a system made up of four concurrently-operating components $p_1$ 103(1) through $p_4$ 103(4). Each of the components is represented in the chart by a vertical line 104. 104(1) represents $p_1$, 104(2) represents $p_2$, and so forth. The processes 103(1 . . . 4) of message sequence chart 101 coordinate their operations by means of messages. Each message is represented by an arrow, for example, arrow 105. Arrow 105 represents a message of the Id type which is sent from process 103(1) to process 103(2). Source and destination are indicated in FIG. 1 by the tail and head of the arrow and in the reference number for the message by the pair of numbers in parentheses following the reference number. For the present discussion, the types of the messages are not important; it is sufficient merely that processes 103(1 . . . 4) interact with each other by means of messages 105 through 121.

When a message is sent, a send event occurs, and when it is received, a receive event occurs. A send event is indicated in the MSC by the point at which the arrow represented by the message leaves the sending process and a receive event is indicated by the point at which the arrow represented by the message strikes the receiving process. In FIG. 1, a send event is shown at 123 and a receive event at 125. Logical and temporal relationships between a MSC's events can be expressed by means of event pairs. For example, event 123 is the causal predecessor of event 125, and that relationship can be expressed by the event pair (123,125).

MSCs are often used in the first attempts to formalize design requirements for a new system and the protocols it supports. MSCs can be used to represent typical execution scenarios, providing examples of either normal or exceptional executions ('sunny day' or 'rainy day' scenarios) of the proposed system. An ITU standard, ITU Z.120, exists for MSCs and for a standard textual form of the MSC. Originally, MSCs were made with pencil and paper; now, many engineers use drawing programs executing on desk top computers to make MSCs; in such cases, the drawing program makes a file which represents the image of the MSC. There further exist system analysis programs which analyze a system and then produce a Postscript file for an MSC representing the system or the ITU Z.120 standard textual form for the MSC. One such program, ObjecTime, is available from ObjecTime Limited, 340 March Road, Suite 200, Kanata Ontario, Canada K2K 2E4.

MSCs are easy to make and read, but there are problems associated with them. The first problem is that there are often inconsistencies between what the MSC appears to show and what may actually happen during an actual system execution. These inconsistencies may have two sources: they can result from incorrect or incomplete assumptions on the part of the designer about chains of dependencies in the design. They can also result from the fact that the MSC does not clearly indicate the semantics of the underlying communication system even though those semantics influence what the MSC means. How an MSC is to be interpreted may depend on whether processes have a single input queue or allow multiple queues, and it may also depend on whether the messages are necessarily stored in FIFO order or not.

The most common of the inconsistencies between what the MSC appears to show and what the system does are race conditions. A race condition exists when two events appear in one (visual) order in the MSC, but can be shown to occur in the opposite order during an actual system execution. If the inconsistency is not discovered during the design phase, it may lead to unspecified reception errors, deadlock, loss of messages, and other types of incorrect behavior in the final system.

The second problem is that there is at present no MSC editor in which drawing an MSC results in the production of more than a file which represents the image. It is thus not possible to interactively draw an MSC and thereby produce a representation of the MSC which can be used for purposes other than displaying the MSC.

SUMMARY OF THE INVENTION

In one aspect, the invention solves the problem of getting from an MSC to a representation with can be used with other computerized design tools by providing a MSC editor which is able to generate an editable image of an MSC from the ITU Z.120 file for an MSC and then alter the ITU Z.120 file as the user edits the image of the MSC. The MSC editor is further able to produce representations of the MSC other than the ITU Z.120 file. In the preferred embodiment, representations include an event list which can be provided to an analyzer which analyzes the MSC for inconsistencies, a Postscript file for the image of the MSC, and an ASCII text file which is a scenario for the MSC. Other embodiments may include other representations, for example representations of the type used by system verification tools.

In another aspect, the invention solves the problem of detecting inconsistencies between an MSC and the actual semantics of the system the MSC represents. The invention makes a list of the events in the MSC and employs the list and a specification of the system semantics which is provided by the user to analyze the MSC and thereby to determine whether what the MSC appears to describe is consistent with the specified semantics. In the preferred embodiment, the MSC being analyzed appears on the display, and when an inconsistency is found, the display is modified to show the inconsistency. The analysis technique can, however be used in systems where the MSC is merely represented by means of an ITU Z.120 file.

Other objects and advantages of the apparatus and methods disclosed herein will be apparent to those of ordinary skill in the art upon perusal of the following Drawing and Detailed Description, wherein:

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first provide an overview of the MSC editor and its operation, then an overview of the use of the invention to find inconsistencies in the MSC. Next will come a formal discussion of how an MSC may be analyzed for inconsistencies, and finally a discussion of implementation details of the invention.

Figure 2:
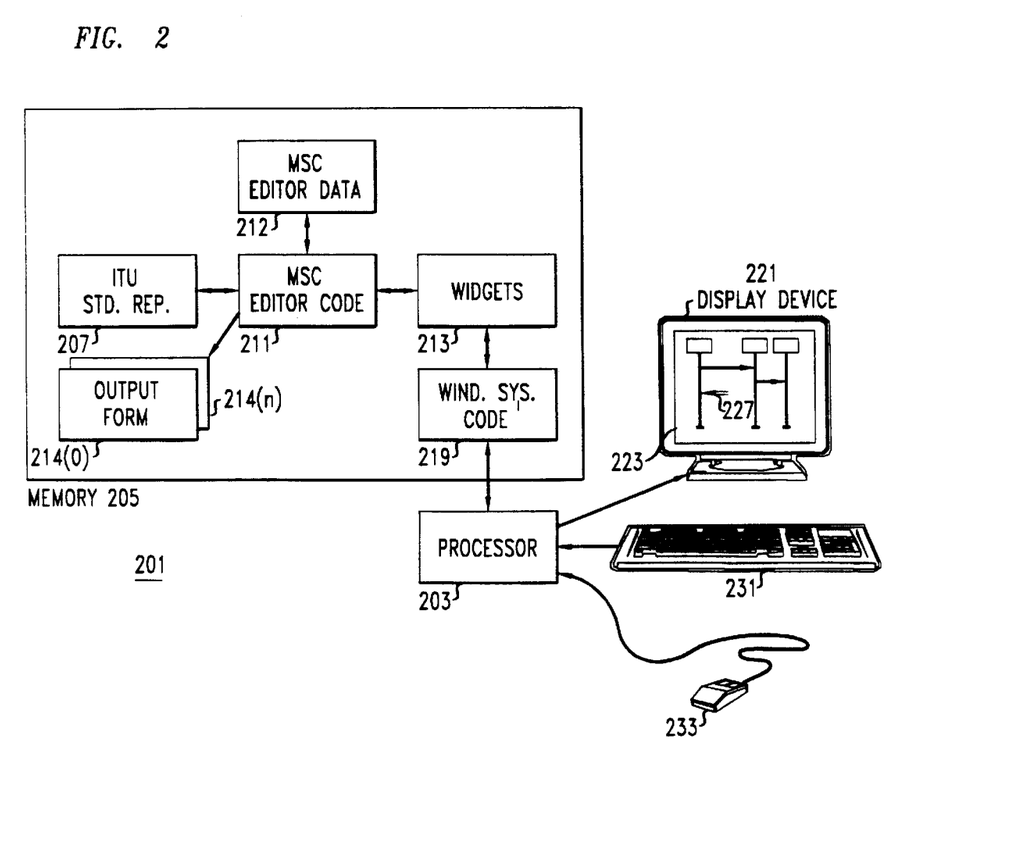
FIG. 2 is an overview of a system in which the MSC editor is implemented.
Figure 3:
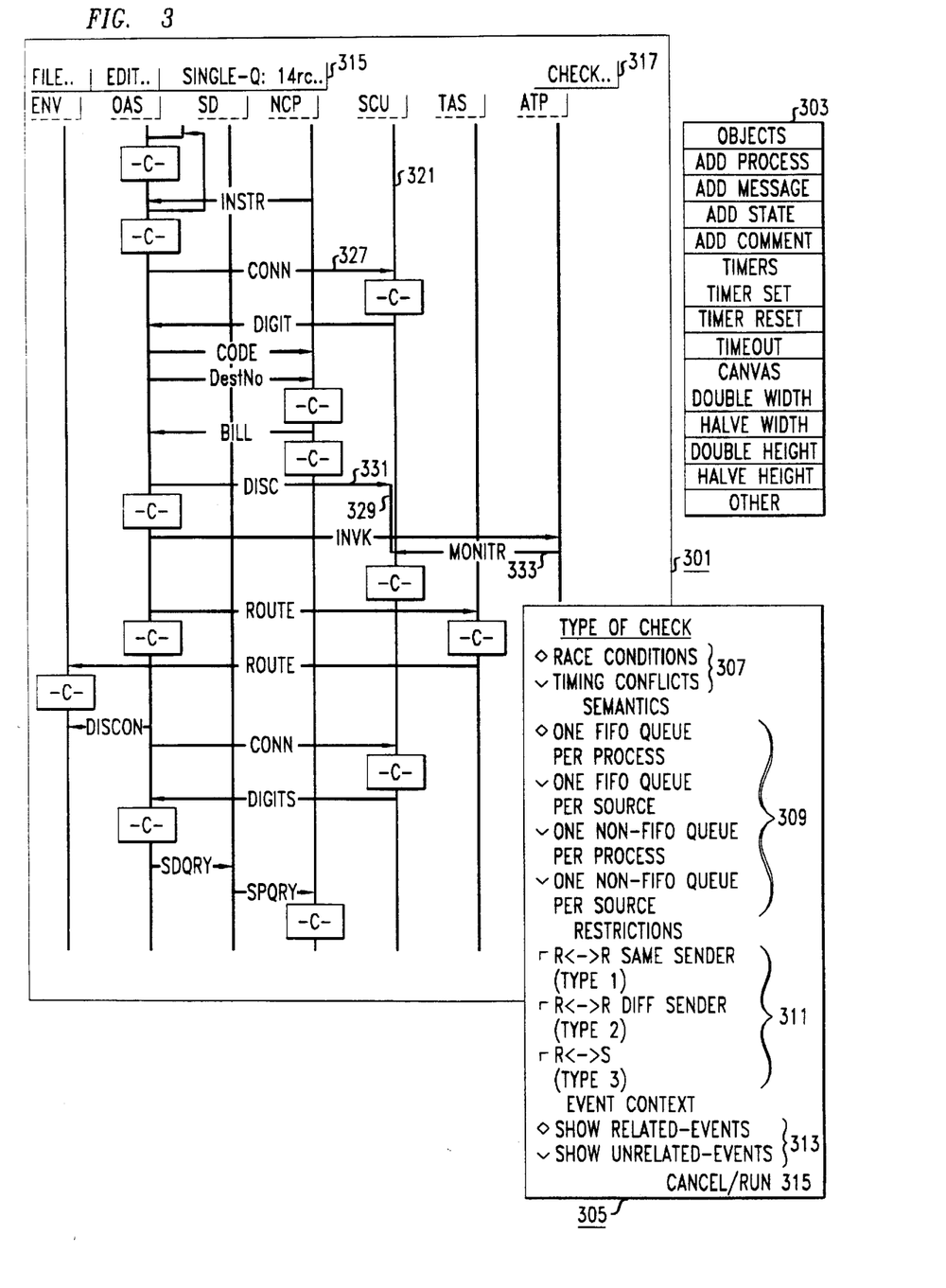
FIG. 3 shows the window in which the MSC editor displays the MSC.
Figure 4:
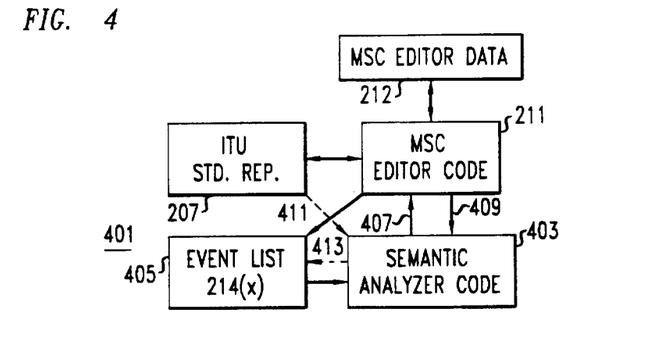
FIG. 4 is an overview of an embodiment which uses the MSC editor to perform inconsistency analysis.

Overview of the MSC Editor: FIGS. 2–4

FIG. 2 is an overview of MSC editor 201. MSC editor 201 is implemented in a preferred embodiment in a work station which employs the UNIX operating system (UNIX is a trademark of the XOPEN foundation) and the X Windows system for controlling a graphical user interface (GUI). The work station includes a processor 203, memory 205 (including storage media such as disk drives) accessible to processor 203, and I/O devices including a display device 221 with a window 223, a keyboard 231, and a mouse 233 which controls a pointer 227 in window 223. Output devices such as printers or plotters may be connected to processor 203 in addition to display device 221, and other pointing devices such as styli may be employed instead of mouse 233.

When the work station is being employed as an MSC editor 201, memory 205 contains MSC editor code 211 and windowing system code 219 and three sets of data structures: widgets 213, which are the data structures used by windowing system 219 to interact with MSC editor code 211, ITU Standard representation 207 of the MSC which presently appears in window 223, and MSC editor data 212, which contains data used by MSC editor code 211 in interacting with representation 207 and widgets 213. MSC editor data 212 includes data which associates each process of the MSC with a list of the events occurring in the process. The order of the events in the list is the top-to-bottom order in which they appear in the MSC. Depending on how system 201 is being used, memory 205 may also contain other forms of output 214(o..n) produced by an execution editor code 211. In a preferred embodiment, these other forms of output include an event list which an analyzer program can use together with a specification of the semantics of the system to analyze the MSC for inconsistencies, a text which is a conventional ASCII annotated scenario for the MSC, and a Postscript file for the MSC. Other embodiments may also include an output which is a representation of the MSC which can be used as input to a system verification program.

In the preferred embodiment, the widgets are made using TCL and the TK toolkit. For details, see J. Ousterhout, TCL and the TK Toolkit, Addison-Wesley, 1994. The arrows in memory 205 show the flow of data between the components; in fact, of course, data is moved by means of processor 203 operating under control of programs stored in memory. Similarly, the program code in memory 205 operates on data only when the program code is being executed by processor 203. For example, when it is stated herein that MSC editor code 211 produces ITU Std. Rep. 207, what is meant is that MSC editor code being executed by processor 203 produces ITU std. Rep. 207.

Operation is as follows: If an ITU standard representation 207 of the MSC being worked with already exists, MSC editor code 211 reads representation 207 and sets values in widgets 213 such that window system code 219 displays the MSC represented by representation 207 in window 223. The user can then manipulate the contents of window 223 with keyboard 231 or pointing device 233. The user inputs to keyboard 231 or pointing device 233 result in hardware interrupts to which windowing system code 219 responds by updating window 223 to reflect the input, by setting values in widgets 213 representing the affected components of window 223, and by invoking callback functions in MSC editor code 211 for those widgets whose values have changed. The callback functions examine the changed values and if they indicate a change in the MSC displayed in window 223, MSC editor code 211 alters MSC editor data 212 to reflect that change. MSC editor data 212 thus always indicates the current state of the MSC. As with other editors, the user can command MSC editor 211 at any time to produce a standard representation 207, and MSC editor 211 will use the data in editor data 212 to produce a new ITU standard representation 207 which reflects the MSC as it exists when the ITU standard representation is made. If the changed values in the widgets require that the MSC be modified, MSC editor code 211 sets values in widgets 213 as required to modify the MSC, and windowing system code 219 responds to those changes by changing the appearance of the MSC in window 223.

FIG. 4 shows a detail 401 of system 201 when system 201 is being used to check the MSC shown in window 223 for inconsistencies. In this application of system 201, MSC editor code 211 produces event list 405 (one of the output forms 214) from the process and event information contained in MSC editor data 212. The event list lists the events for each process in the MSC in the order in which they are displayed in window 223. Having made the event list, MSC editor code 211 causes semantic analyzer code 403 to begin execution.

Semantic analyzer code 403 receives an input 407 from MSC editor 211 which specifies the semantics of the system represented by the MSC. This input 407 is produced by MSC editor 211 in response to a menu selection made by the user of system 201. In a preferred embodiment, the menu selections specify ways in which messages received by a process are stored prior to being responded to by the process. Semantic analyzer code 403 does the analysis by using event list 405 and the specification of the semantics to determine for each event pair in the MSC whether the event pair belongs to one of three sets of event pairs:

enforced: a set of event pairs for which the order of the events in the pair is determined by the underlying architecture of the system;

inferred: a set of event pairs for which the order of the events in the pair is not determined by the underlying architecture but is specified by the MSC; and don't care: a set of event pairs for which the order of the events in the pair is irrelevant to determining inconsistencies.

Which of the three sets a given event pair belongs to is determined by the semantics specified by the user.

Having assigned the event pairs of the MSC to the three above sets as required by the semantics, semantic analyzer 403 computes the transitive closure of the enforced set of event pairs and then determines whether each of the event pairs in the inferred set is in the transitive closure. If it is not, there is an inconsistency between that event pair and the specified semantics. When there are inconsistencies, semantic analyzer 403 provides output 409 to MSC editor 211 indicating how the appearance of the MSC in window 223 is to be changed to reflect the inconsistency. MSC editor 211 then sets values in widgets 213 which cause windowing system code 219 to actually change the appearance of the MSC in window 223.

It should be noted here that the information which MSC editor code 211 reads from MSC editor data 212 to produce event list 405 is also contained in ITU standard representation 207. Consequently, in other embodiments, semantic analyzer code 403 could itself read standard representation 207 and make the event list, as indicated by dashed arrows 411 and 413. Further, output 409 indicating inconsistencies could be textual instead of visual, and inconsistency analysis could thus be done solely on ITU standard representation 207, without display device 221.

Detail of Window 223: FIG. 3

FIG. 3 shows a detail of window 223. Window 223 contains display window 301, which shows the MSC, with processes indicated by vertical lines 321 and messages by horizontal arrows 327. Display window 301 also contains a horizontal menu at 315 and 317. As is common with windowing systems, when the user selects file, a menu showing the file operations appears; when the user selects check 317, MSC editor 201 checks for inconsistencies and creates a menu (not shown) which lists all inconsistencies between the MSC and the chosen semantics. When the user selects an inconsistency from the menu, the corresponding event pair and the messages associated with the event pairs are highlighted. In FIG. 3, there is a race condition indicated at 329. The last entries at 315 indicates what kind of semantics was specified for the check and the total number of race conditions.

There are two control windows: window 305 is a menu by means of which the user specifies what kind of checking is being done and the semantics to be used in the checking. Window 303 is a menu by means of which the user can add entities to the MSC displayed in in window 301 and modify the display of that MSC. The entities include processes, messages, state information about a process, comments, and timers. The latter specify intervals between events, and the menu selections permit not only specification of timers, but setting them, resetting them, and specification of a timeout condition on a timer.

Window 305 permits the user to specify to the system that it should check for race conditions or timing inconsistencies at 307, to specify the underlying semantics of the system being represented in the MSC at 309, and to specify what the display should show concerning a selected event at 313. In the preferred embodiment, the user specifies the underlying semantics by employing menu 309 to select one of four arrangements used to store the messages received by the processes in the MSC. The user can also employ restrictions menu 311 to inhibit system 401 from reporting certain kinds of inconsistencies. For example, if the first selection under the Restrictions menu is selected, inconsistencies involving messages received from the same sending process will not be reported. In other embodiments, the user may define his own semantics by assigning event pairs to the three sets described above and analyzer 403 will used the three sets to do the analysis.

As can be seen from FIG. 3, when the user wishes to check an MSC displayed in window 301 for inconsistencies, the user specifies at least what kind of check (here, race conditions are specified) and the semantics of the system (here, one FIFO queue per process), and presses run button 315. In response to the run button, MSC editor 211 provides semantic analyzer 403 with argument 407 indicating what check is to be made and what the semantics of the system are. Semantic analyzer 403 then performs the specified check and returns result 409 indicating that there is a race condition 329 between message and how MSC editor 211 is to modify the appearance of window 301 to indicate the race condition. MSC editor 211 then sets values in the widgets 213 as required and windowing system code 219 redraws window 301 to show the race condition.

Figure 5:
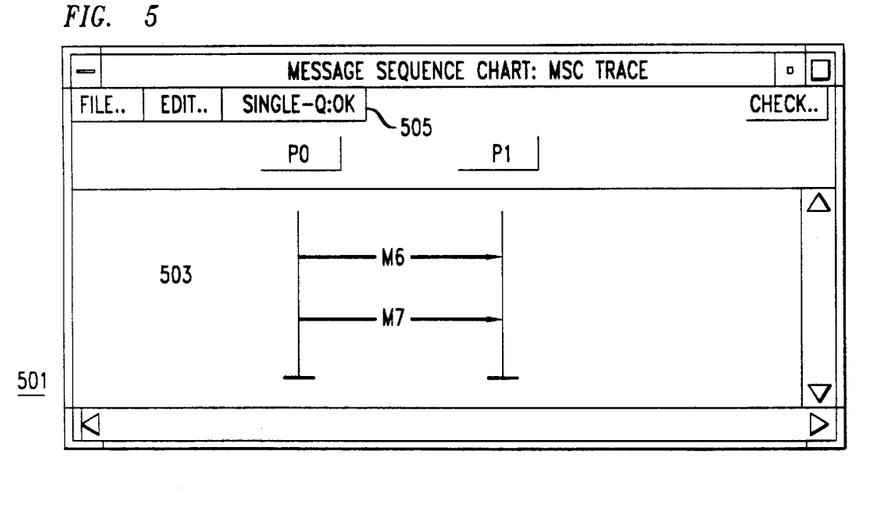
FIG. 5 shows an MSC which is not inconsistent with a first semantics.
Figure 6:
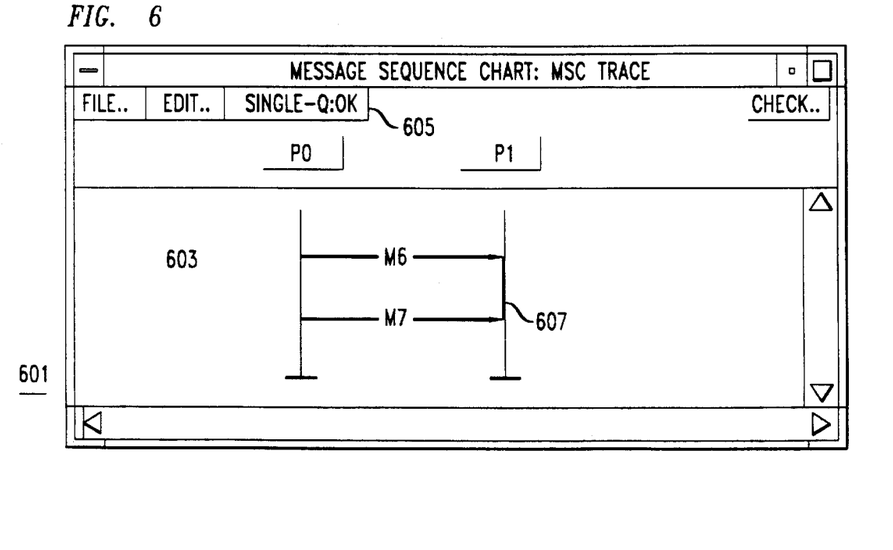
FIG. 6 shows the MSC of FIG. 5 which is inconsistent with a second semantics.

Semantics and Inconsistencies: FIGS. 5 and 6

FIGS. 5 and 6 show how the the existence of an inconsistency in an MSC depends on the semantics of the system the MSC is representing. Both figures show a simple MSC with two processes P0 and P1 and two messages, M6 and M7. In FIG. 5, window 501 shows MSC 503 as it is displayed when the semantics of the system, as shown at 505, specify a single FIFO queue per process. Under those semantics, all messages to process P1 are placed in a single FIFO queue. That being the case, process P0 will place message M6 in process P1's FIFO queue before it places message M7 in process P1's FIFO queue, and since the FIFO queue preserves the order in which the messages are input, process P1 will always receive message M6 before it receives message M7 and and semantic analyzer 403 will conclude that a race condition can never arise, as indicated by the "ok" at 505.

In FIG. 6, by contrast, window 601 shows MSC 603 when it is displayed when the semantics of the system, as shown at 605 specify a single non-FIFO queue per process. Under those semantics, all messages for process P1 are placed in a single queue, but the queue does not necessarily preserve the order in which the messages are input. It is thus possible that process P1 will receive message M7 before it receives message M6, and consequently, there is a race condition between the messages. Semantic analyzer 403 detects the race condition and causes MSC editor 211 to change the display as shown at 607 to indicate the race condition. Additionally, analyzer 403 causes MSC editor 211 to output the diagnostic message "1 rc" at 605, indicating that one race condition has been found.

Figure 7:
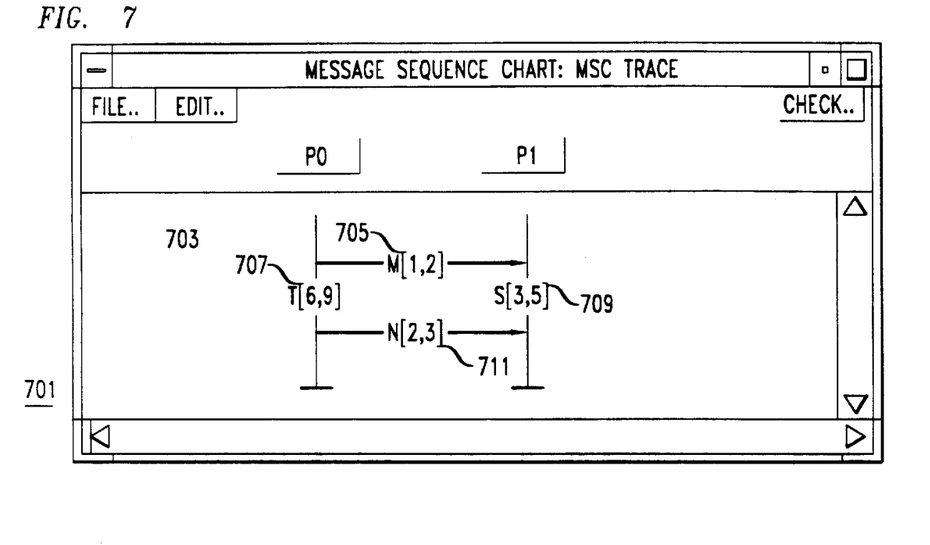
FIG. 7 shows an MSC for which time constraints are specified.

Timing Conflicts and Timing Inconsistency: FIG. 7

MSC editor 201 together with semantic analyzer 403 may also be used to check timing conflicts and timing inconsistencies. FIG. 7 shows how the timing constraints are specified in MSC editor 201. The timing constraints are expressed as closed, open, or half-closed intervals, with a round bracket indicating an open interval and a square bracket a closed interval. In FIG. 7, all of the intervals are closed. An interval on a message indicates the bounds of the time required to send the message, and an interval on a process indicates the time between sending messages. Thus, M[1,2] 705 indicates that the time required to send message M to send message M from P0 to P1 is at least 1 time unit and no more than 2 time units; T[6,9] 707 indicates that the interval between the time process P0 sends message M and the time it sends message N must be at least 6 units and no more than 9 units. Intervals 711 and 709 are to be interpreted similarly.

To specify a timing interval on a message, the user simply types the interval on the arrow representing the message.

Timing intervals for processes are process state, so the user specifies a timing interval by selecting the "state" item in menu 303, then clicking on a location in a process. A state label appears and the user types the interval in the state label.

MSC 703 with the indicated time constraints has a timing inconsistency: process P1 is expecting message N at most 5 units after it receives message M, which means that message N has at most 7 units from the time process P0 sends message M to arrive at process P1. Message N, however, is sent at a minimum 6 units after message M and takes at a minimum of 2 units to arrive at process P2, for a total of 8 units. It can consequently never arrive within the required 7 units after it is sent by process P0 or 5 minutes after it is received by process P1.

Semantic analyzer 403 is able to analyze MSC 703 for timing conflicts and inconsistencies, and when it finds such conflicts or inconsistencies, it marks the messages in the same fashion as for races. It also indicates how the intervals need to be corrected to eliminate the conflicts or inconsistencies.

Figure 8:
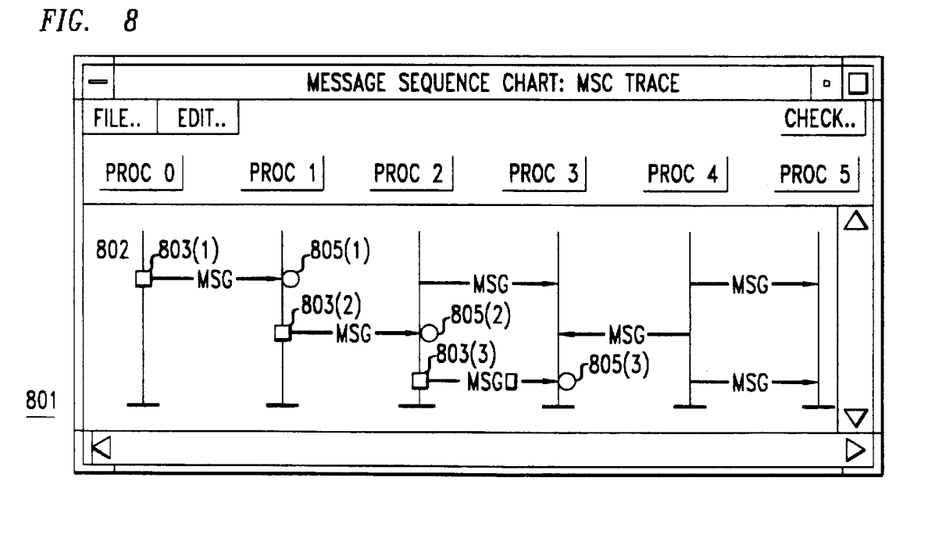
FIG. 8 shows an MSC in which the user has requested a display of related events.

Showing Related Events: FIG. 8

As mentioned above, control menu 305 permits the user of system 201 to specify that display 223 show events related to a given event. FIG. 8 illustrates how this feature works. When this feature is activated, the user selects a single event (either the sending of a message or the receiving of one in the MSC being displayed (here, MSC 802). All related events are then displayed. Send events 803 are indicated by squares 803; receive events are indicated by circles 805. In the preferred embodiment, temporal relations are indicated by the colors of the squares and circles. The selected event (in this case receive event 805(2)) is displayed in a preferred embodiment in red; related events which precede the selected event (here, send event 803(1), receive event 805(1), and send event 803(2)) are displayed in green; related events which follow the selected event (here send event 803(3) and receive event 805(3)) are displayed in yellow.

Figure 9:
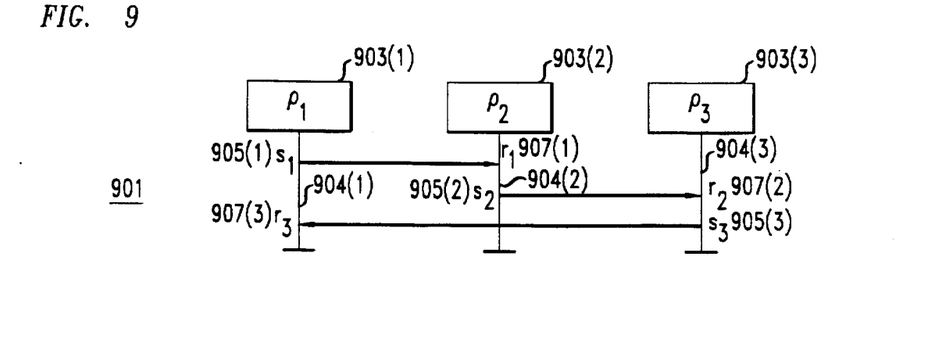
FIG. 9 is an example MSC.

Formal Analysis of Message Sequence Charts: FIG. 9

The data structures used in event list 405 and semantic analyzer code 403 are based on the following formalization of message sequence charts.

As shown in FIG. 9, for each process p 903 in the system being represented by MSC 901, there is a vertical line 904 which defines a local visual order $<_p$ on all the events belonging to p 103. MSC 101 in FIG. 9 contains 3 processes 903, numbered from left to right $p_1$, $p_2$, $p_3$.

Each event is either a send event 905 or a receive event 903, and belongs to one specific process. In FIG. 9, the events of sending and receiving messages are labeled by $\{r_0, r_1, r_2, r_3, s_0, s_1, s_2, s_3\}$. (The labeling is not part of the MSC itself.) For each send event, there exists a matching receive event, and vice versa. This means that, in the charts that we will use, there are no anonymous environment processes. If an environment process is used, it is always represented by a vertical line in the MSC. As we will see in the sequel, the actual order of occurrence of any two events in the MSC may or may not correspond to the visual order in the chart, depending on the semantic interpretation that is used.

A message sequence chart M defines a labeled directed acyclic graph with the following components:

Processes: A finite set P of processes.

Events: A finite set S of send events and a finite set R of receive events such that S∩R is empty. The set S∪R is denoted by E.

Process Labels: A labeling function L : E→P that maps each event e to a process L(e) E P. The set of events belonging to a process p is denoted by $E_p$.

Send-receive Edges: A compatibility bijection c: S→R such that each send event s is mapped to a unique receive event c(s), and vice versa R→S such that each receive event r is mapped to a unique send event c(r).

Visual Order: For every process p there is a local total order $<_p$ over the events $E_p$ which corresponds to the order in which the events are displayed. The relation $$<\!\!\Delta/\!=\!(\cup_p <_p) \cup \{(s,c(s)) | s \in S\}$$

contains the local total orders and all the edges, and is called the visual order.

The visual order defines an acyclic graph over the events since send-receive edges cannot go upwards in the chart. The visual order does not necessarily reflect the semantics of the MSC. Although some event e might appear before an event f in the visual order, this might be only due to the two dimensionality of the diagram; it might be that e and f can in practice occur in either order. An automated scenario analyzer can warn the designer in these cases that events may occur in an order that differs from the one in which they are shown.

Figure 10:
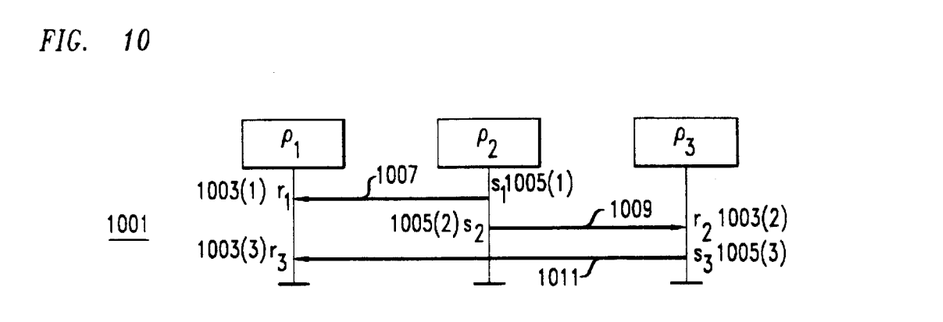
FIG. 10 is an example MSC.

Ambiguities in MSC Specifications: FIG. 10

To illustrate the potential ambiguity of MSC specifications, two questions need to be addressed in assigning semantics to MSCs:

1. Which causal precedences are enforced by the underlying architecture?

2. Which causal precedences are likely to be inferred by the user?

Any discrepancy between the answers to the above two questions

Consider FIGS. 9 and 10. In FIG. 9 it is reasonable to infer that receive event $r_3$ 907(3) occurs after send event $s_1$ 905(1). The intuition is that $p_2$'s send event $s_2$ 905(2) is delayed until the arrival of $r_1$ 905(1), and $p_3$'s send event $s_3$ 905(3) is delayed until the arrival of $r_2$ 907(2). Since a message cannot be received before it is sent, we have $$s_1 <\!\!< r_1 <\!\!< s_2 <\!\!< r_2 <\!\!< s_3 <\!\!< r_3 \qquad (1)$$

where the symbol << represents causal precedence.

However, in MSC 1001 of FIG. 10, it is not clear if receive event $r_1$ 1003(1) precedes the receive event $r_3$ 1003(3). It is possible that message 1007 sent from $p_2$ to $p_1$ takes longer than the total time it takes for the messages 1009 and 1011 from $p_2$ to $p_3$ and then from $p_3$ to $p_1$. Although the user may be tempted to assume, based on the visual order, that $r_3$ 1003(3) must always follow $r_1$ 1003(1), this is not necessarily the case. An implementation of the protocol that is based on this assumption may encounter unspecified reception errors, it may deadlock, or, if it cannot distinguish between the two messages and merely assumes that one will always precede the other, it may end up deriving information from the wrong message.

The ITU Z.120 standard contains a mechanism for defining that the order of occurrence of events is either unknown or immaterial, using co-regions, which are indicated by a dashed line in the chart. It can, however, be hard to assess correctly in practice precisely when a co-region would be required, redundant, or invalid.

The semantics of the enforced order can also depend on the underlying architecture of the system. Consider, for instance, two subsequent messages, sent one after the other from one process to the other. The arrival of the messages in the same order in which they were sent is guaranteed only if the architecture guarantees a FIFO queuing discipline. When this is not guaranteed, an alternative semantics in which messages can overtake each other is called for.

Figure 11:
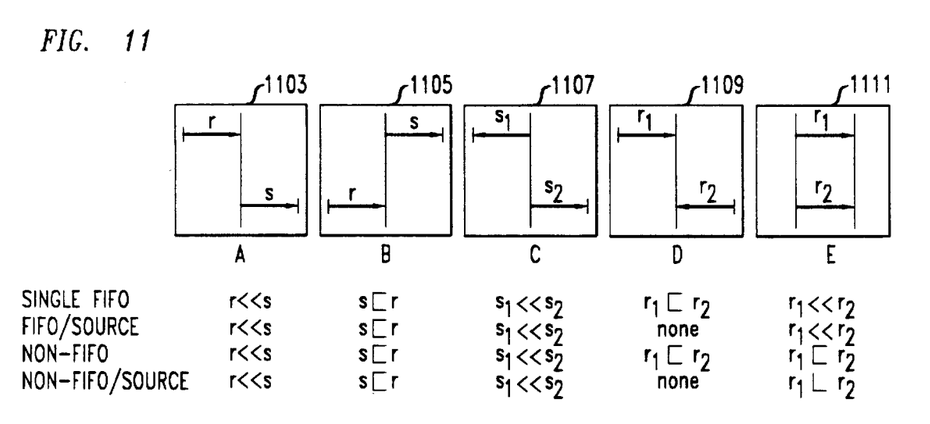
FIG. 11 shows defaults for interpreted MSCs.

Interpreted MSCs: FIG. 11

There is no single generally accepted semantics for MSCs. The standard imposes only a partial one. Another semantics interpretation appears in P. B. Ladkin, S. Leue, "What do message sequence charts mean?", in: *Formal Description Techniques VI,* 1994, Elsevier, pp. 301–315. As discussed above, the correct semantic interpretation may depend on many things that cannot be standardized, such as the particulars of the underlying architecture or the communication medium and queueing disciplines that are used. We therefore adopt a user-definable semantics here, and predefine only a small number of reasonable semantic interpretations.

There are three types of causal precedences that we will distinguish in this paper:

The visual order <. As explained above, the visual order corresponds to the scenario as drawn. Some of the event pairs that appear in the visual order are not necessarily required to occur in the order drawn; they appear ordered only because the two dimensionality of the chart requires a total order over events within each process.

The enforced order <. This order contains all the event pairs that the underlying architecture can guarantee to occur only in the order specified. For example, if a send event follows a receive event in the enforced order, then the implementation can force the process to wait for the receive event before allowing the send event to take place. The message sent may, for instance, may need to carry information that is acquired from the message to be received.

The inferred order ⊏. Events that are ordered according to the inferred order are likely to be assumed by the user to occur in this order. An example is events which have a visual order in the MSC. A tool can check that the inferred order is valid by computing the transitive closure of the enforced order.

The enforced and the inferred orders can both be defined as subsets of the visual order, i.e., (<<∪⊏) ⊆ <. Different semantic interpretations correspond to different rules for extracting the enforced and inferred order from the visual order. For example, a pair (s, c(s)) of a send and a corresponding receive event is always part of the enforced order. On the other hand, a pair $(r_1, r_2)$ of receive events in the visual order may appear in either the enforced order or in the inferred order, but it need not appear in either.

Formally, an interpreted message sequence chart M consists of the following components:

An MSC (P, S, R, L, c, $\{<_p | p \in P\}$),

For every process p, a binary relation $<<_p$ over $E_p$: $e<<_p f$ means that event e is known to precede event f. It is required that $<<_p$ is a subset of the visual order $<_p$. The enforced order << is $(\cup_p <<_p) \cup \{(s, c(s)) | s \in S\}$.

For every process p, a binary relation $⊏_p$ over $E_p$: $e ⊏_p f$ means that event e is assumed to precede event f. It is required that $⊏_p$ is a subset of the visual order $<_p$. The inferred order ⊏ is $\cup_p ⊏_p$.

Since the enforced order << corresponds to the causality in the system, one can compute the order <<* among the set of events, i.e., its transitive closure. It can then be verified that ⊏ is a subset of <<*. If this is not the case, there is an inconsistency between the enforced and the inferred order, and the user is likely to make an invalid inference about the behavior of the system specified. For example, the race inconsistency in FIG. 10 corresponds to a semantics in which << is $\{(s_1, r_1), (r_1, s_2), (s_2, r_2), (r_2, s_3), (s_3, r_3)\}$, while $(s_1, r_3)$ is in ⊏.

Observe that since the visual order is acyclic, so is the relation <<* due to the requirement that each $<<_p$ is a subset of $<_p$. Also note that the two orders << and ⊏ cannot be inconsistent with each other since both are consistent with the visual order.

There is more than one reasonable semantic interpretation of an MSC. As an example, we will consider four possible choices, each tied to a different choice for the underlying architecture. Consider two events of the same process p. Each event is either a send or a receive event, with a matching receive or send event in some other process. FIG. 11 illustrates the five cases that are relevant to the default set of interpretations used in a preferred embodiment of system 201.

Four default choices for the relations <<and ⊏ are indicated, as shown in FIG. 11 and enumerated below. Cases A 1103, B 1105, and C 1107, share the same interpretations in all four defaults. Cases A 1103 and C 1107 formalize the notion that a send event is a controlled event, that is only issued when the preceding events in the visual order have indeed occurred. The order is therefore enforced in both cases, under all semantic interpretations. In case B 1105, the inference is made that the receive event r can happen only after the send event s, to account for the case where s is meant to provoke the reception r. Cases D 1109 and E 1111 distinguish between the the case when the two matching send events for two receive events that arrive to the same process p belong to the same process q or to two different processes q and r, and are interpreted differently in different defaults:

1. Single FIFO-queue per process: Each process p has a single FIFO queue to store all the messages received by p. Messages received by p from the same source arrive in the order in which they are sent (case E), but messages received by p from different sources (case D) need not arrive in the order sent. The inferred order of receive events corresponds to the visual order. In this semantics, if a process is waiting to receive a message $r_1$, and if $r_2$ arrives before $r_1$, then $r_2$ may be lost, or a deadlock may occur.

2. One FIFO queue per source: Each process p has one FIFO queue for every process q to store all the messages received by p from q. Since messages received from different sources are stored in different buffers, no order is inferred for the two receives in case D. This is because with multiple queues, a process has direct access to the first message arriving from each process, and the relative order of two messages arriving from difference processes is unimportant. If the wrong message arrives first, the receiving process would still be able to wait for the arrival of the other message, and after processing the second one, the first one would still be in its own message input queue.

3. Single Non-FIFO queue per process: The order in which messages are received is not necessarily the same as the order in which the messages are sent. Thus, for case E, no order between $r_1$ and $r_2$ is known. The inferred order between receive events corresponds to the visual order.

4. One Non-FIFO per source: Each process p has one FIFO queue for every process q to store all the messages received by p from q. Due to non-FIFO nature, for case E, the order among receives is only inferred, and not necessarily enforced. Due to multiple queues, for case D no order is inferred for receives from different sources.

Alternative interpretations may be provided for different choices of the underlying queuing model. The default interpretation of FIG. 11 applies to all event pairs in each process. In other embodiments, the user may also be given an explicit override capability, to make different semantic choices for specific, user-selected, event pairs.

The Analysis of MSCs

Consider an interpreted MSC with visual order <, enforced order <<, and inferred order ⊏. To find inconsistencies the transitive closure <<* of the enforced order is computed and compared against the inferred order.

Race Condition: Events e and f from the same process p are said to be in a race if (e ⊏f) but (not e<<* f).

The MSC-analysis-problem is to compute all the races of a given interpreted MSC.

The causality relations << and <<* define partial orders over the set E of all events in M. Once the transitive closure is computed, inconsistencies can be identified by examining each event pair in the inferred order.

The following algorithm can be used to compute the transitive closure.

Assume the MSC has n events. Since there are no cycles, we can number the events 1 . . . n, such that the numbering defines a total order that is consistent with visual order <. The numbering can be done in time O(n), using a standard topological sort algorithm. One such algorithm may be found in T. H. Cormen, C. E. Leiserson, R. L. Rivest, Introduction to Algorithms, MIT Press, 1990. A boolean two-dimensional matrix C is used to store the pairs in <<*. All entries of C are initially false.

Algorithm 1:

```
for e := 1 to n do
    for f := e - 1 downto 1 do
        if not C[f][e] and f << e then
            C[f][e] := true;
            for g := 1 to f - do
                if C[g][f] then C[g][e] := true
```

In this algorithm, the value of each of the $n^2$ entries in C can change from false to true at most once. Call event f an immediate predecessor of event e if f<<e and there is no event g such that f<<g<<e.

Theorem 0.1 Given an interpreted MSC with n events. If relation<<contains l pairs (f, e) such that event f is an immediate predecessor of event e, then the computational complexity of Algorithm 1 is $n^2+ln$.

Observe that the innermost loop of the algorithm is executed for a pair (e, f) only if the event f is an immediate predecessor of the event e. For the default choices of FIG. ??, l is bounded by 2n, which means that for these choices the computational complexity of Algorithm 1 is $O(n^2)$.

Figure 12:
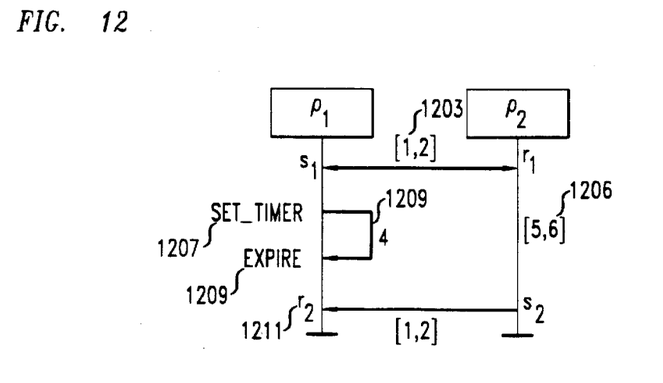
FIG. 12 shows another MSC with timing constraints.

MSCs with Timing Constraints: FIG. 12

In this section, we describe an extension of MSCs to specify also timing constraints on a message flow. As an example, see MSC 1201 in FIG. 12. The label [1, 2] 1203 on the edge from $s_1$ to $r_1$ specifies the lower and upper bounds on the delay of message delivery. The label [5, 6] 1205 on the vertical line from $r_1$ to $s_2$ specifies bounds on the delay between $r_1$ to $s_2$, and models an assumption about the speed of process $p_2$. The event seltimer 1207 corresponds to setting a timer 1209 which can expire after 4 time units. In the preferred embodiment, control menu 303 is used to add timers to MSCs and to set them. The timing information is consistent with the visual order of the two receive events expire 1209 and $r_2$ 1211. Thus, the timing information can be used to deduce additional causal information, or to rule out possible race inconsistencies. It can also be used to compute maximum and minimum delays between pairs of events.

Let $R^+$ be the set of nonnegative real numbers, and let us consider intervals of $R^+$ with integer endpoints. Intervals may be open, closed or half-closed, and may extend to infinity on the right. Examples of intervals are (0, ∞), [2, 5], (3, 7], where the round brace indicates an open interval, and the square brace a closed one. The set of intervals is denoted by I.

A timed MSC M consists of

An interpreted MSC with enforced order << and inferred order ⊏.

A timing function $T_{<<}$:<<→I that maps each pair (e, f) in the enforced order << to an interval $T_{<<}$(e, f). This function models the known timing relationships: the event f is known to occur within the interval $T_{<<}$(e, f) after the event e.

A timing function T⊏: ⊏→I that maps each pair (e, f) in the inferred order ⊏ to an interval T⊏(e, f). This function models the timing constraints that the user wants to check for consistency.

A timing assignment for a timed MSC M is a function T : E→$R^+$ that assigns, to each event e, a time-stamp T(e) such that for every pair (e,f) in the enforced relation << the time difference T(f)−T(e) belongs to the interval $T_{<<}$(e,f). Thus, a timing assignment gives the possible times at which events may occur. A sample timing assignment for the MSC of FIG. 12 is $T(s_1)=0$, $T(r_1)=2$, $T(set\_timer)=1.5$, $T(s_2)=7$, $T(expire)=5.5$, $T(r_2)=8$ As before, the user may choose the defaults for the relations << and ⊏. The default timing function $T_{<<}$ maps each pair (e, f) in << to the interval (0, ∞).

Timed MSCs can also contain three types of design problems:

1. Timing Inconsistency: There exists no consistent time assignment for the MSC.
2. Visual Conflicts: A pair (e, f) of events belonging to the same process p is said to be a visual conflict of the timed MSC M if f appears before e in the visual order (f<$_p$ e) but in every timing assignment T, e happens before f according to T.
3. Timing Conflicts: A pair (e, f) of events is said to be a timing conflict of the timed MSC M if e is assumed to occur before f (e ⊏f), but there is a timing assignment T such that the time difference T(f)−T(e) does not belong to the interval T⊏(e, f).

Timing inconsistency corresponds to an unsatisfiable set of timing constraints such as those of MSC 703 of FIG. 7. The visual conflict corresponds to the case when the timing constraints imply that the event e always precedes f, in an order opposite to their visual order. Timing conflict corresponds to the case that the inferred bounds are not necessarily satisfied by the timing assignments. The MSC of FIG. 12 has no conflicts. Observe that timing imposes additional ordering, and hence, it may be the case that while the underlying interpreted MSC has races, but the timed MSC has no conflicts.

The analysis problem for timed MSCs is defined as follows. The input to the timed-MSC-analysis-problem consists of a timed MSC M. If M has timing inconsistency then the output reports inconsistent specification. If M is consistent then the answer to the MSC-analysis-problem is the set of all visual or timing conflicts.

The timing constraints imposed by the timing function $T_{<<}$ are linear constraints, where each constraint puts a bound on the difference of two variables. Solving such constraints can be reduced to computing negative-cost cycles and shortest distances in weighted digraphs, as described in C. H. Papadimitriu and K. Steiglitz, *Combinatorial Optimization-Algorithms and Complexity*, Prentice-Hall, 1982.

The analysis can include both strict and nonstrict inequalities. In order to deal with different types of bounds uniformly, the cost domain D can be defined to be $Z \times \{0, 1\}$, where Z is the set of all integers (such analysis is typical of algorithms for timing verification, see, for instance, R. Alur, et al., "Timing verification by successive approximation", in: *Information and Computation* 118(1), pp. 142–157, 1995, and D. L. Dill, "Timing assumptions and verification of finite-state concurrent systems", in: *Automatic Verification Methods for Finite State Systems*, LNCS 407, pp. 197–212, 1989. The costs of the edges of the graph is from the domain D. To compute shortest paths, we need to add costs and compare costs. The ordering < over D is the lexicographic ordering: (a, b)<(a', b') iff a<a' or a=a' with b<b'. The addition is defined by (a, b)+(a', b')=(a+a', b+b') (note that over the boolean component+is disjunction). A strict inequality x−y<a is now written as x−y<(a, 1) and a nonstrict inequality x−y<a is now written as x−y<(a,0)

Given a timed MSG M, define a weighted digraph $G_M$ as follows. The set of vertices of $G_M$ is the set E of events. Consider a pair (e, f) in the enforced order. If $T_{<<}$(e, f)=[a, b], the graph $G_M$ has an edge from e to f with cost (−a, 0), and from f to e with cost (b,0). If $T_{<<}$(e,f)=(a, b], the graph $G_M$ has an edge from e to f with cost (−a, 1), and from f to e with cost (b, 0). If $T_{<<}$(e, f)=[a, ∞) then the graph $G_M$ has an edge from e to f with cost (−a, 0), and there no edge from f to e. The cases [a, b), (a, b), and (a, ∞) are handled similarly. Thus, the cost of the edge from an event e to an event f gives an upper bound on the difference T(e)−T(f) for a time assignment for M.

Lemma 0.2 The timed MSC M is timing inconsistent iff the graph $G_M$ has a negative cost cycle.

Suppose M is timing consistent. Let $d_{ef}$ be the length of the shortest path from e to f in the graph $G_M$ (let $d_{ef}$ be ∞ if no such path exists). The shortest paths, then, represent all the timing assignments for M:

Lemma 0.3 Let M be a consistent timed MSC. A function T: E→$R^+$ is a timing assignment for M iff T(e)−T(f)<$d_{ef}$ for all events e, f.

Consequently, a pair (e, f) of events belonging to a process p with e<$_p$ f is a visual conflict iff there is a path from f to e with negative cost (i.e. $d_{fe}$<0). Let (e, f) be a pair of events in c. The pair (e, f) is a timing conflict iff the interval T⊏is included in the interval [—$d_{ef}$, $d_{fe}$]. It is clear that the timed-MSC-analysis-problem can be solved by computing the shortest paths in $G_M$. To compute shortest paths, we use the classical dynamic programming algorithm, which may be found in R. W. Floyd, "Algorithm 97" (Shortest Path), in: *Communications of the ACM* 5, 1962, p. 365, or S. Warshall, "A theorem on boolean matrices", *Journal of the ACM*, 9 (1962), pp. 11–12. This immediately leads to the following theorem:

Theorem 0.4 Given a timed MSC M with n events the timed-MSC-analysis-problem is solvable in time $O(n^3)$.

Figure 13:
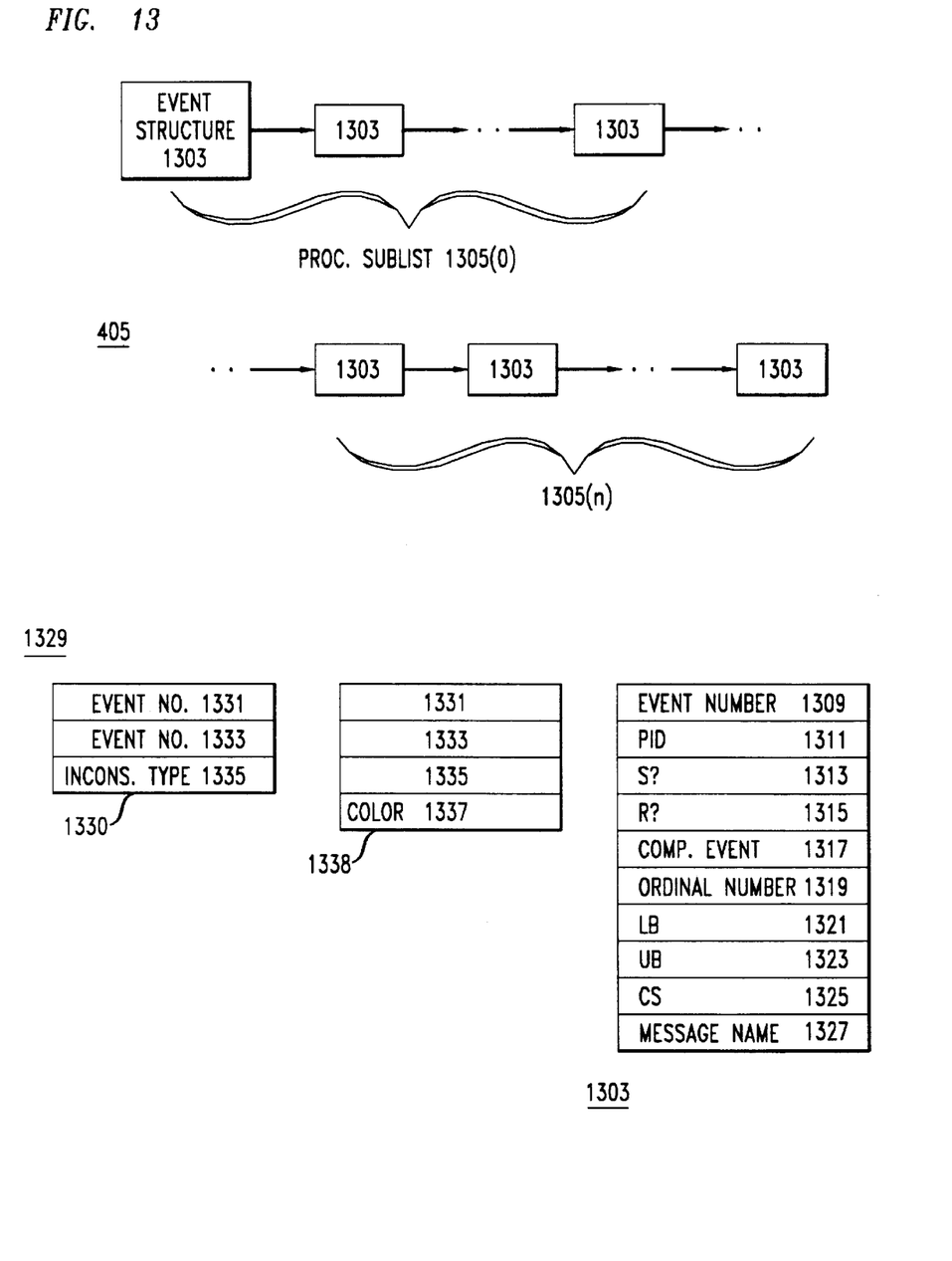
FIG. 13 shows an implementation of the event list in a preferred embodiment.

Representing the Event List and the Inconsistencies: FIG. 13

The MSC analysis just described in performed in the preferred embodiment by semantic analyzer code 403 using the information in event list 405. FIG. 13 shows how event list 405 is implemented in a preferred embodiment. Event list 405 is a linked list of event structures 1303. There is an event structure 1303 for each send or receive event in the MSC presently displayed in window 223. Event list 405 has a process sublist 305(n) for each process in the MSC.

Within each process sublist 305(n), the event structures 1303 have the order that the events have in the line that represents the process in the MSC. The events in each sublist 305(n) thus have the visual order defined above.

Each event structure 1303 has the data elements shown in detail at 1303 of FIG. 13. Elements 1309 through 1319 are used for analysis of causal constraints; the remaining elements are used for analysis of temporal constraints. Element 1309 is a number which identifies the event in the MSC; PID 1311 is another number which identifies the process to which the event belongs; S? 1313 indicates whether the event is a send event; R? 1315 indicates whether it is a receive event; field 1317 contains the event number for the complementary event, i.e., the send event corresponding to a given receive event and vice-versa. Ordinal number of the event 1319 is a number which represents the event's position relative to the other events on the process line.

The timing information in fields 1321–1325 is optional. It includes lower bound 1321, which is any specified lower bound on delay for the message associated with the event; upper bound 1323, which is the upper bound on that delay; and constraint 1325, which is the bounds of the delay between the present event and another event (specified in constraint 1325) in the process. Field 1327, finally, is the name of the message associated with the event.

As will be apparent from FIG. 13 and the foregoing discussion of MSC analysis, the data structures of FIG. 13 provide the information necessary to determine the visual order <. If the user has selected a message transmission semantics from menu 309, semantic analyzer 403 determines enforced order << and inferred order ⊏ from the selected semantics and event list 405. In a preferred embodiment, the enforced order and inferred order are determined according to the defaults of FIG. 11.

The transitive closure <<* of the enforced order can be computed from the enforced order using algorithm 1 described above, and if there is any event pair in the inferred order ⊏ which is not in the transitive closure, there is an inconsistency for that event pair between the MSC and the semantics which was used to produce the set of enforced pairs. The information in event list 405 may be similarly used as described in the section MSCs with Timing Constraints above to discover timing inconsistencies, visual conflicts, and timing conflicts.

Information about the causal and timing inconsistencies discovered by system 201 is returned to the execution of MSC editor code 211 in the forms shown at 1329 in FIG. 13. For each pair of events for which there is an inconsistency, both structure 1330 and structure 1338 are returned. Structure 1330 includes the numbers 1331 and 1333 of the inconsistent events and a value 1335 indicating the type of inconsistency; system 201 uses this information to construct the previously-mentioned list of inconsistencies which appears in window 223. Structure 1338 includes the information in structure 1330 plus an indication at 1337 of the color that is to be used to show an inconsistency in window 223.

Conclusion

The foregoing Detailed Description has shown those skilled in the relevant arts how to make and use a message sequence chart analyzer which produces a variety of representations of a message sequence chart in response to a user's manipulation of a display of the message sequence chart and which furthermore permits the user to analyze the system represented by the message sequence chart for race conditions and other inconsistencies. The analysis is made according to a user-provided definition of the semantics of the system represented by the message sequence chart. The Detailed Description has further disclosed the best mode presently known to the inventors of making their message sequence chart analyzer.

It will be immediately apparent to those skilled in the relevant arts that there are many ways in which systems employing the techniques discloses herein may be implemented. For example, other interactions may be employed to edit the MSC and to specify semantics and other techniques may be used to display inconsistencies. Moreover, other embodiments may permit specification of procedure state other than time constraints. The MSC editor may further be implemented using other GUI systems and may produce representations of the MSC other than those listed herein. The event list may be implemented in fashions other than the one disclosed herein, and any algorithm which computes the transitive closure may be used instead of the one disclosed herein.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. Apparatus for detecting an inconsistency between a message sequence chart which describes a system and a semantic of the system, the semantic being one of a plurality thereof, and the apparatus comprising:

a representation of the message sequence chart from which a visual order of pairs of send events and receive events in the message sequence chart can be determined;

a specification of one of the plurality of semantics which is received from a user of the apparatus; and means responsive to the representation and the specification of the semantic for determining from the specified semantic and the visual order whether there is any inconsistency between the message sequence chart and the semantic.

2. The apparatus of claim 1 wherein at least a particular one of the pairs of send events and receive events is a enforced event pair, the particular enforced event pair being a function of the system's architecture.

3. The apparatus of claim 1 wherein at least a particular one of the pairs of send events and receive events is an inferred event pair, the particular inferred event pair being a function of the message sequence chart.

4. The apparatus of claim 1 wherein the visual order is acyclic.

5. A method implemented in a computer system for detecting an inconsistency between a message sequence chart which describes a system and a semantic of the system, the method comprising the steps of:

receiving a semantic specification which specifies one of a plurality of semantics;

receiving a representation of the message sequence chart and determining therefrom a visual order of pairs of send events and receive events in the message sequence chart;

using the specified semantic to classify the pairs of send and receive events in the visual order into an enforced order and an inferred order;

computing a transitive closure of the enforced order; and if a pair is in the inferred order but not the transitive closure, indicating the presence of the inconsistency.

6. The method of claim 5 wherein the pairs of send and receive events in the enforced order occur in a specific order.

7. The method of claim 6 wherein the specific order is a function of the system's architecture.

8. The method of claim 5 wherein the inconsistency is a race condition.

9. The method of claim 5 wherein the inferred order is a function of the message sequence chart.

10. Editing apparatus implemented in a computer system including a display and an input device for editing a message sequence chart, the message sequence chart describing a concurrent system, the editing apparatus comprising:

a representation of the message sequence chart as a set of processes and a set of events, the representation being accessible to the computer system;

a memory for storing a specification of at least one of a plurality of semantics of the concurrent system;

a graphical system implemented in the computer system which is responsive to inputs including inputs from the input device for controlling the display and which provides outputs indicating a state of the display; and an editor implemented in the computer system, the editor being responsive to the representation and to the state outputs, the editor operating in response to the representation to provide inputs to the graphical system which cause the graphical system to display the message sequence chart represented by the representation, and the editor operating in response to state outputs indicating an inconsistency between the message sequence chart and the specification of the semantic to modify the displayed message sequence chart to correspondingly modify the representation.

11. The editing apparatus of claim 10 wherein the plurality of semantics are semantics received as input from a user of the editing apparatus.

12. The editing apparatus of claim 10 wherein the inconsistency is a race condition.

* * * * *